Feb. 15, 1966     J. C. HONHART     3,235,148
ROD AND TOOL TOTER
Filed Feb. 17, 1964
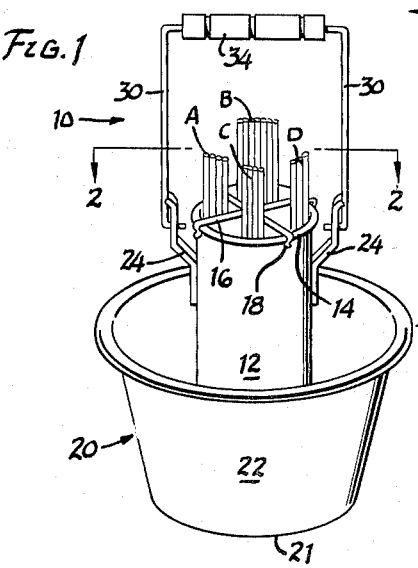
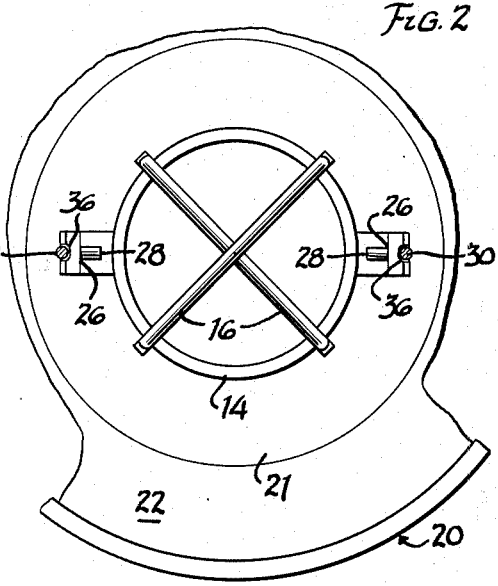
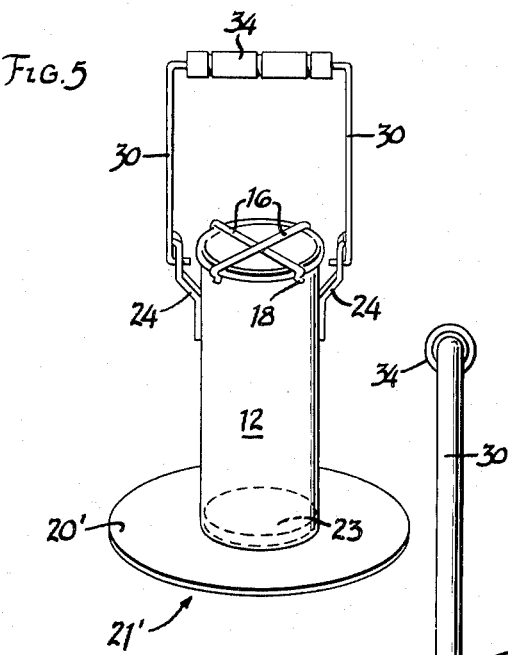
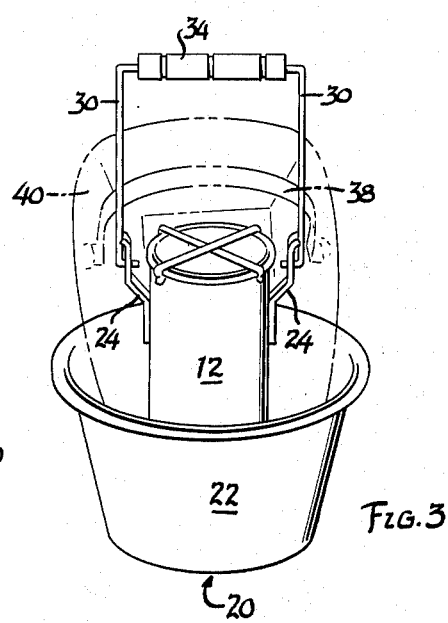
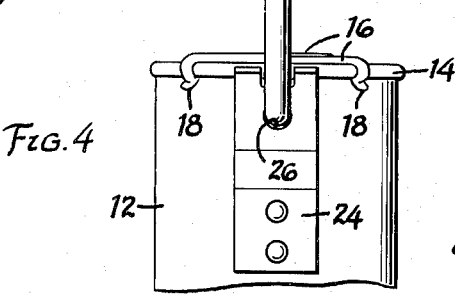
INVENTOR.
JACK C. HONHART
BY
WILSON, SETTLE & CRAIG
ATTORNEYS 3,235,148
ROD AND TOOL TOTER
Jack C. Honhart, 98 Manor, Birmingham, Mich.
Filed Feb. 17, 1964, Ser. No. 345,363
7 Claims. (Cl. 224—46)

This invention relates to a container and more particularly to a container particularly adapted to carry and support assorted welding rods, tools and other welding accessories for ready access by a welder at a welding location.

In the past, the welding rods, tools and accessories required for a particular welding job have generally been hand-carried and placed on a workbench, floor or workpiece surface during the welding operation. Often such loose rods have been scattered, lost or intermingled as to welding type. Hand-carrying and consequential scattering of such loose welding rods have also often damaged the flux coatings normally applied to arc welding rods. Such intermingled or damaged rods must usually be scrapped or used in non-critical welding applications since welds made with such rods would generally fail to meet required welding specifications.

The temperatures usually imparted to various welding tools and accessories during welding use have generally precluded the safe carrying or storage of such items in the pockets of garments or aprons or in special toolholders located on the person of the welding operator. Even when not being used in the welding process, such tools and accessories placed on or near the welding workpiece may absorb a high degree of heat dangerous to the unsuspecting welding operator. The heat thus absorbed is not easily dissipated.

The invention broadly contemplates an improved container adapted to support and carry assorted welding rods, tools and/or accessories which is of simple economical, easily fabricated construction; a container capable of supporting and of separately maintaining substantial number and weight of different rods for various welding operations in a substantially vertical position; a welding rod container providing easy access to the various rods stored therein; and a welding rod container having a handle located and detented in an extended position to facilitate carrying of the container and to provide easy access to the container supported rods.

With regard to certain of its more specific aspects, the invention further contemplates and features a divided central rod container supported in a vertical position by an outer base pan secured thereto and forming an annular compartment adapted to receive and support the various welding tools and accessories for ready access during the welding operation and for subsequent air cooling. This tool carrying base pan or compartment may also be used as a receptacle for hot rod stubs thus eliminating dangerous clutter of the workpiece, bench, floor or scaffolding where they may be slipped on, scorch the welding cable or result in other types of fire damage. Upon cooling, such pan collected stubs may be subsequently dumped thus reducing non-productive clean-up time and permitting salvage for scrap.

A combined rod and tool carrier illustrative of the invention is further adapted to support and carry the welder's helmet and other welding tools and accessories including clamps, pliers, weld cleaning tools such as slag chipping hammers and wire brushes, ball-peen hammers and chisels, a metal rule or other suitable measuring device and the welder's gloves.

The foregoing and other objects, advantages and features of the invention will be apparent from the following description of several illustrative embodiments, having reference to the accompanying drawings, wherein:

FIGURE 1 is a perspective view of a combined rod and tool supporting carrier constructed in accordance with the invention;

FIGURE 2 is an enlarged fragmentary view sectioned substantially in the plane of the line indicated at 2—2 of FIGURE 1 and shows the rod-separating divider and the handle detenting support brackets in plan elevation;

FIGURE 3 is a perspective view showing the manner in which a welder's helmet may be supported by the combined rod and tool holder of FIGURE 1;

FIGURE 4 is an enlarged fragmentary side elevational view taken in the direction indicated at 4—4 in FIGURE 1 and further illustrates the rod divider and handle supporting means of this carrier; and FIGURE 5 is a view of a rod carrying container similar to but omitting the tool carrying pan of the previous embodiment.

Referring more particularly to FIGURE 1, a combined rod and tool carrier illustrative of the invention is indicated generally by the reference numeral 10. This carrier comprises a cylindrical or tubular member 12 forming a central rod supporting receptacle of a height substantially less than the rods normally supported therein. A bottom wall of a shallower outer base pan 20 is concentrically embossed upwardly and suitably secured to the lower end of the central member. The pan 20 thus closes and forms a weighted base or bottom flange 21 normally supporting the central rod supporting member 12 in a vercal position. The upper open end of the member 12 has a peripheral bead 14 and is subdivided to support various different types of rods, A, B, C and D, by crossed interconnected wires forming a divider member 16 having depending end portions or spring legs 18 adapted to resiliently snap over the upper peripheral bead 14 on the central container.

The side walls 22 of the pan 20 of the illustrative embodiment are flared or inclined outwardly and cooperate with the bottom wall of the pan and the pan attached base portion of the central container to support and maintain various welding tools and accessories obliquely therebetween for air cooling and ready handling access when not in use and/or while being carried to and from the welding location.

Two handle supporting brackets 24 are secured to diametrically opposite sides of the central container substantially above the upper periphery of the lower pan. These brackets are bent outwardly and upwardly from their attachment to the central container and are coaxially perforated at 26 to pivotally receive the inwardly bent opposite ends 28 of a U-shaped handle 30. The handle for the illustrative container is thus supported for swinging movement about a substantially horizontal axis adjacent the open upper end of the central rod receiving member 12. The handle 30 is formed of a rod of sufficient strength and has a horizontally disposed bight portion 32 substantially spaced from the upper end of the central container and from the welding rods supported therein. This bight portion of the handle may rotatably support a suitable hand grip member 34 as shown.

As best shown in FIGURES 2 and 3, detent notches 36 formed in the upper outer ends of the handle supporting brackets 24 are engageable to maintain the handle in a vertical position. This detent maintained position of the handle 30 facilitates carrying of the combined rod and tool carrier 10 and provides unrestricted access to the rods separated by the divider 16 and stored in the central container 12. When in its detent maintained vertical position, the handle 30 may be used in cooperation with the central rod supporting member 12 and tool supporting pan 20 to receive the head strap 38 and thus support and carry a welding helmet 40 in the manner shown in FIGURE 4.

As indicated at 42, the side walls 22 of the pan 20 may be pierced at spaced intervals slightly above the bottom wall 21. These openings provide air circulation through the pan and may be used for drainage and cleaning the pan bottom, including the disposal of rod stubs collected therein for salvage.

In the form of the invention shown in FIGURE 5, like reference numerals identifying elements similar to those of the previous embodiment. The tool supporting base pan 20 of the previous embodiment, however, is replaced by a cylindrical plate 20' concentrically secured to the bottom of the central rod container 12. The plate 20' thus forms an annular base flange 21' normally supporting the rod supporting tubular member in a vertical upwardly opening position as in the previous embodiment. In this form of the invention, the base plate may be of sufficient thickness and weight to maintain the central rod supporting member 12 against tipping due to any unbalance due to an uneven distribution of welding rods supported therein. However, an additional rod balancing mass 23 may be inserted in the bottom of the central container.

From the foregoing description of several illustrative embodiments, it will be seen that the invention provides a rod supporting container or carrier of simple construction capable of meeting the several stated objectives and advantages. It will be further apparent that various modifications and changes may be made in and from the illustrative embodiments without departing from the spirit and scope of the invention as defined in the following claims:

1. A container for welding rods, tools and accessories comprising a vertically disposed tubular member of a height substantially less than the length of the welding rods normally supported by the container, an outer pan member having a bottom wall secured to and closing the lower end of the tubular member and having side walls spaced outwardly from said tubular member and of a height substantially less than the height of said tubular member and said pan cooperating with said tubular member to form an annular tool and accessory receiving outer compartment and laterally supporting the tubular member to receive a plurality of welding rods therein.

2. In combination with a container as set forth in claim 1, a divider of angularly spaced, radially intersecting members secured to and partitioning the open upper end of the tubular member to receive and maintain welding rods of different size and welding characteristics separately within the tubular member.

3. The combination set forth in claim 1 further including two handle supporting brackets secured to opposite sides and adjacent the upper end of the tubular member, a handle member for carrying the container comprising a U-shaped rod having depending legs each pivotally connected at one end thereof to an opposite one of said handle supporting brackets and having a substantially straight interconnecting bight portion distal from said pivotal connections, a hand grip mounted on said bight portion, and detenting means associated with said handle supporting brackets and engageable by said handle legs to maintain said handle member in an extended vertical position thereby supporting said hand grip in substantially spaced relation above the welding rods supported in the container.

4. In a container as set forth in claim 3, a divider of spaced intersecting members mountable to partition the open upper end of the tubular member to receive and maintain welding rods of different sizes and welding characteristics separately within the tubular member.

5. In the combination set forth in claim 2, said divider forming members each having outer end portions overlying and bent downwardly to resiliently engage the tubular member adjacent its rod receiving upper end.

6. In the combination set forth in claim 3, said handle member in its extended detent maintained vertical position cooperating with the tubular and outer pan members of the container to receive and support a welding helmet placed thereon during the carrying of container by said hand grip.

7. A container for welding rods comprising a tubular member of a length less than the rods normally supported in the container and having a peripheral bead at its upper open end, dividers having resilient ends engaging said bead, and an annular base member secured to and closing the lower end of the tubular member and forming an annular flange extending away from and entirely around said tubular member, said base member providing a weighted base including said annular flange formed thereby to support and maintain the tubular member in a vertical position.

References Cited by the Examiner
UNITED STATES PATENTS

| | | | |
|---|---|---|---|
| 598,801 | 2/1898 | Minter | 220—20 |
| 1,296,158 | 3/1919 | Bonham | 211—69 |
| 2,193,727 | 3/1940 | Jouffray | 211—69 |
| 2,390,631 | 12/1945 | Young | 224—45.15 |
| 2,740,546 | 4/1956 | Kowalski | 220—16 |

GERALD M. FORLENZA, *Primary Examiner.*
HUGO O. SCHULZ, *Examiner.*